United States Patent [19]

Iwasaki

[11] Patent Number: 4,717,900

[45] Date of Patent: Jan. 5, 1988

[54] LOW PROFILE ELECTROMAGNETIC LINEAR MOTION DEVICE

[75] Inventor: Shinichiro Iwasaki, Troy, Mich.

[73] Assignee: Aisin Seiki Kabushiki Kaisha, Japan

[21] Appl. No.: 595,482

[22] Filed: Mar. 30, 1984

[51] Int. Cl.⁴ .............................................. H01F 7/08
[52] U.S. Cl. ...................................... 335/230; 335/234
[58] Field of Search ......................... 335/229, 230, 234

[56] References Cited

U.S. PATENT DOCUMENTS

| | | | |
|---|---|---|---|
| 3,202,886 | 8/1965 | Kramer | 335/234 |
| 3,504,315 | 3/1970 | Stanwell . | |
| 4,195,277 | 3/1980 | Leicht . | |
| 4,259,602 | 3/1981 | Kuribayashi et al. . | |
| 4,358,691 | 11/1982 | Naylor | 335/234 X |
| 4,490,815 | 12/1984 | Umehara et al. | 335/234 X |

FOREIGN PATENT DOCUMENTS

| | | | |
|---|---|---|---|
| 1398594 | 3/1965 | France | 335/230 |
| 633786 | 2/1962 | Italy | 335/234 |

Primary Examiner—George Harris
Attorney, Agent, or Firm—Banner, Birch, McKie & Beckett

[57] ABSTRACT

What is disclosed is an electromagnetic linear motion device having a pair of electromagnetic units mounted in spaced parallel position with a permanent magnetic armature between them. A gap is maintained between the units which is sufficiently small to permit most of the magnetic lines of flux generated by the units to pass along upper and lower plates forming each unit. The gap is sufficiently small, however, to prevent the magnetic cores of each unit from saturating and reducing the force generated by the device. The novel arrangement of the electric coils within each unit permits additional turns to be added for increasing the force generated by the device without increasing overall thickness.

14 Claims, 5 Drawing Figures

LOW PROFILE ELECTROMAGNETIC LINEAR MOTION DEVICE

BACKGROUND OF THE INVENTION

This invention generally relates to the field of electromagnetic devices, and more particularly, is directed to a low profile electromagnetic linear motion device.

Electromagnetic devices are widely used to provide on demand remote movement of mechanical devices. For example, solenoids are commonly employed to impart motion to a mechanical device by the application of an electric current. The typical solenoid comprises one or more electric coils wound around a core. When an electric current is applied to the coil, an electromagnet is formed having a North pole and a South pole as is well known in the art. Magnetic lines of flux flow between the two poles and any ferrous metal which the lines of flux cut across will be attracted to the electromagnet. The amount of attractive force generated by the magnet is proportional to flux density. Flux density is a function of both the number of turns in the coil of the magnet and the amount of current flowing through the coil. The greater the number of turns and/or the larger the current flow, the greater the flux density and thus, the greater the attractive force.

In most practical applications, the amount of current available to flow through the coils is usually fixed by the power source and cannot be readily changed. Thus, when additional attractive force is required, the number of turns in the coil must be increased. Increasing the number of turns, however, correspondingly increases the size of the device. In many applications, size is an important consideration. Thus, electromagnetic devices known in the prior art are deficient in this respect.

An electromagnetic device typical of those known in the prior art is disclosed in U.S. Pat. No. 3,504,315 issued in the name of Stanwell. This device is cylindrical in shape and comprises first and second electromagnetic coils wound around a cavity which receives an armature. When the coils are energized, the armature travels within the cavity dependent on the direction of current flow through the coils. The motion of the armature is transmitted to a rod which imparts motion to an external device. Increasing the number of turns in the coils to provide additional force increases the diameter of the device.

Electromagnetic devices of the type disclosed by Stanwell are often used to control the power door lock system in automobiles. A solenoid or actuator is installed in each door panel for operating the door lock mechanism. In modern automobiles, the thickness of the door panels are becoming increasingly thinner. Thus, the solenoids which operate the door lock system must be made corresponding thinner. In solenoids known in the prior art, such as the one disclosed by Stanwell, reducing the thickness of the solenoid to allow it to fit in a confined space, such as modern-day automotive door panels, also reduces its pushing and pulling force. Accordingly, such devices are also deficient in this respect.

SUMMARY OF THE INVENTION

It is the overall object of the present invention to provide a new and improved electromagnetic linear motion device which overcomes the disadvantages of prior art devices.

It is a specific object of the present invention to provide a new and improved electromagnetic linear motion device which is thinner than such devices known in the prior art without a loss in the amount of force that the device can produce.

It is another specific object of the present invention to provide a new and improved electromagnetic linear motion device which is more efficient than such devices known in the prior art.

It is a still further object of the present invention to provide a new and improved electromagnetic linear motion device which is lighter in weight than prior art devices for the same force produced.

It is a further object of the present invention to provide a new and improved electromagnetic linear motion device which is reliable and can be economically manufactured.

The present invention comprises an electromagnetic linear motion device comprising two electromagnetic units connected together with a permanent magnet armature between them. Each unit includes an elongated electric coil mounted between an upper and a lower plate. The coil is mounted away from a forward edge of the plates to form an armature receiving cavity. The two units are then connected together with a small air gap separating the plates. The air gap is sufficiently small to permit most of the magnetic flux generated by the coils to flow between the coils along the upper and lower plates. Only a small portion of the flux flows through the permanent magnet armature. Thus, the armature is less likely to become demagnetized over time. The air gap is sufficiently wide, however, to prevent the core of the coils from becoming saturated. Thus, the device operates at high efficiency over the full travel of the armature. Because of the configuration of the coil and the magnetic circuit design, additional windings can be placed on the coil cores to produce greater force without increasing the thickness of the device.

DESCRIPTION OF THE PREFERRED EMBODIMENTS

Figure 1:
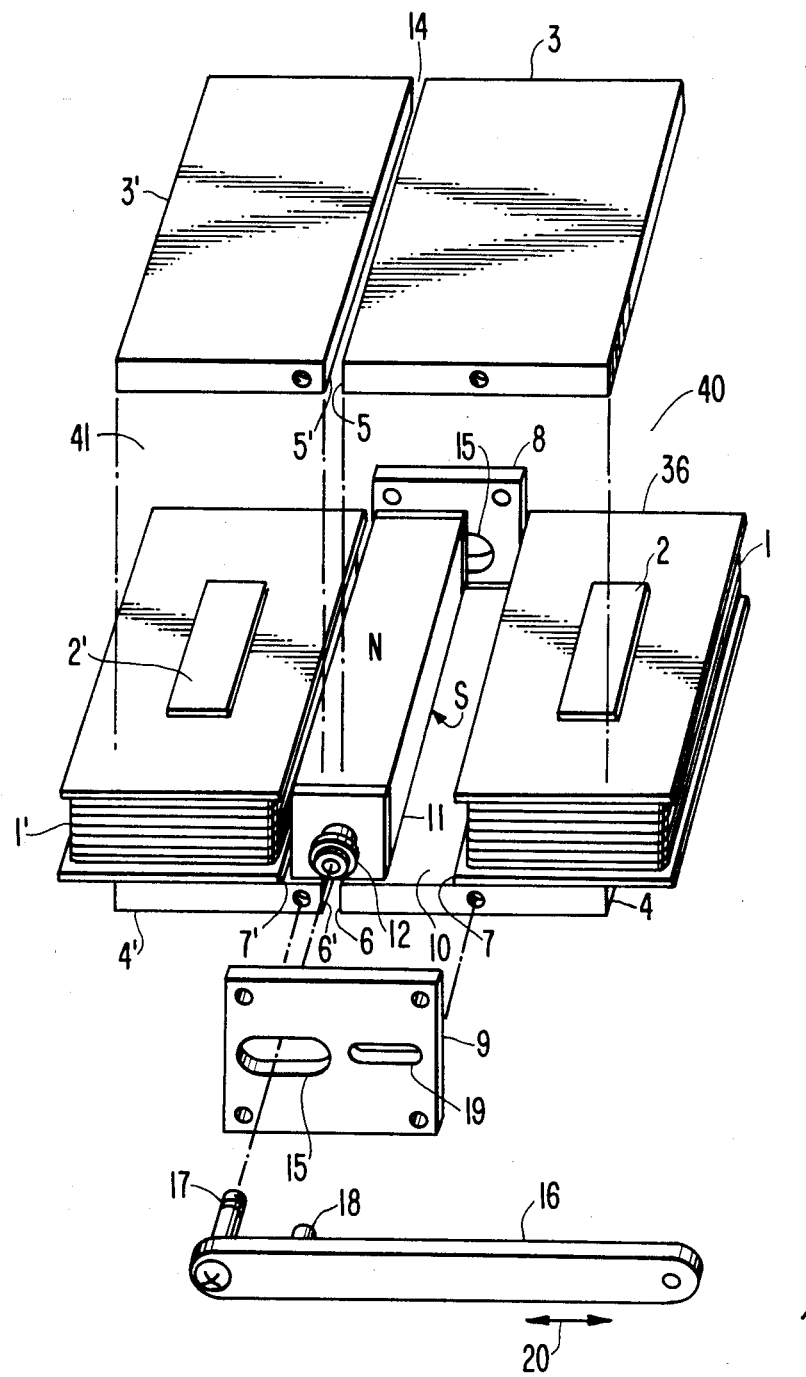
FIG. 1 is an assembly view of an electromagnetic linear motion device in accordance with one embodiment of the present invention.

FIG. 1 illustrates one embodiment of an electromagnetic device in accordance with the present invention. The device comprises two electromagnetic units 40 and 41 which are identical in construction. Each unit, e.g., unit 40, includes an elongated electromagnetic coil 1 wound on bobbin 36 around magnetic core 2 mounted between upper and lower plates 3 and 4, respectively. Upper and lower plates 3 and 4 are formed with forward edges 5 and 6. Edge 7 of bobbin 36 is spaced rearwardly of edges 5 and 6 to define armature receiving cavity 10 between plates 3 and 4 and coil 1. Corresponding electromagnetic unit 41 is similar in construction, with like reference numbers in prime indicating similar parts.

Units 40 and 41 are held together by connecting guide members 8 and 9, with gap 14 between corresponding edges 5, 5' and 6, 6'. Disposed in armature receiving cavity 10 of both units is elongated permanent magnet armature 11 which is movable longitudinally therein. Each end of armature 11 includes guide projections 12 which are received in slots 15 of connecting guide members 8 and 9. Guide projections 12 cooperate with slots 15 to guide armature 11 within cavity 10 when it is acted upon by electromagnetic units 40 and 41 as will be explained below with reference to FIG. 2. The motion of armature 11 within cavity 10 is transmitted to an external device by arm 16. Arm 16 is connected to one of guide projections 12 through slot 15. Arm 16 may be threadedly connected to guide projections 12 by threaded member 17 as shown or may be connected by any other means known in the prior art, e.g., welding or rivets. Stud 18 is also provided on arm 16 which is moveably retained in slot 19 of connecting guide member 9 to provide longitudinal stability for arm 16 as it is moved in the direction of arrow 20 by the movement of armature 11.

Figure 2:
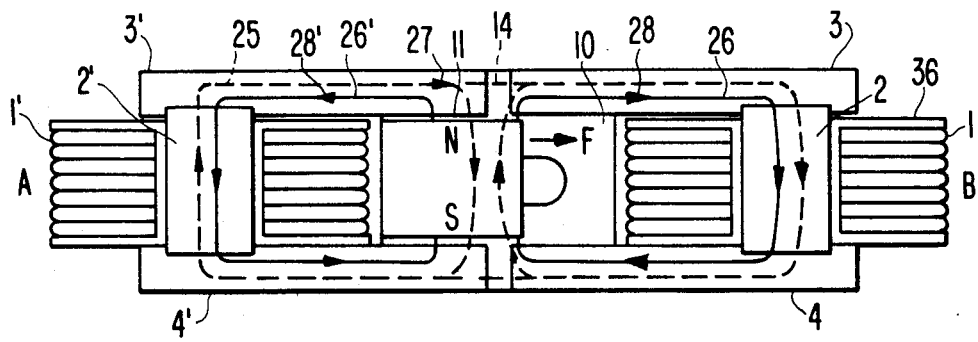
FIG. 2 is a section view of the electromagnetic linear motion device shown in FIG. 1.
Figure 3:
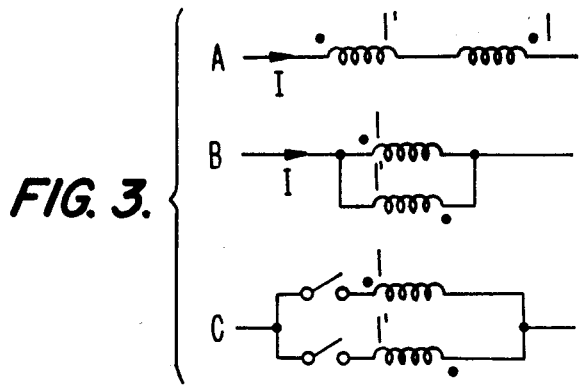
FIG. 3 is a wiring diagram showing alternative electrical connections for the electric coils of the electromagnetic linear motion device shown in FIG. 1.

With reference to FIGS. 2 and 3, the operation of the electromagnetic device in accordance with the present invention will be described. As shown in FIG. 3, coils 1 and 1' may be electrically connected in a number of ways. In FIG. 3A, coils 1 and 1' are connected in series. In FIG. 3B, the coils are connected in parallel and in FIG. 3C, the coils are also connected in parallel, however, each coil may be individually controlled. In each circuit arrangement, the coils are connected so that the current flow through one coil is the opposite of the current flow through the other coil as indicated by the dot (·). Thus, when the coils are energized, the electromagnetic lines of flux generated by one electromagnetic unit attracts armature 11 while the electromagnetic lines of flux generated by the other unit repells armature 11.

The selection of a particular connection scheme for coils 1 and 1' is based in large part on the use of the device and its environment. Where a fast response time or increased force is required, the connection arrangement of FIGS. 3A and 3B may be used as these connections provide for simulataneous current flow through both coils. Thus, armature 11 will be attracted to one electromagnetic unit while being repelled by the other unit. Thus, the travel of armature 11 within cavity 10 will be much faster and with greater force. Armature 11 may be moved in the opposite direction by reversing the flow of current through the coils. In the wiring arrangement shown in FIG. 3C, each coil may be selectively energized to move armature 11 toward a respective electromagnetic unit. However, in this arrangement only one coil is energized at a time. Thus, the armature is attracted by one electromagnetic unit, but is not repelled by the other unit. Such a connection consumes less electrical power.

FIG. 2 illustrates the path of the electromagnetic flux lines produced by coils 1, 1' and armature 11. The flux generated by coils 1 and 1' flows as indicated by broken line 25 in the direction of arrow 27. The size of gap 14 is sufficiently small so that from core 2', the majority of the flux flows along upper plate 3' across gap 14 to upper plate 3, through core 2, along lower plate 4, across gap 14 again to lower plate 4' and back through core 2'. A relatively small portion of the flux also flows through armature 11.

The majority of the flux produced by permanent magnet armature 11 flows through cores 2 and 2' as indicated by lines 26 and 26' in the direction of arrows 28 and 28'. As armature 11 moves rightward, the amount of flux through core 2 increases while the amount of flux through core 2' decreases. Conversely, when armature 11 moves leftward, the armature of flux through core 2' increases while the amount of flux through core 2 decreases.

Figure 5:
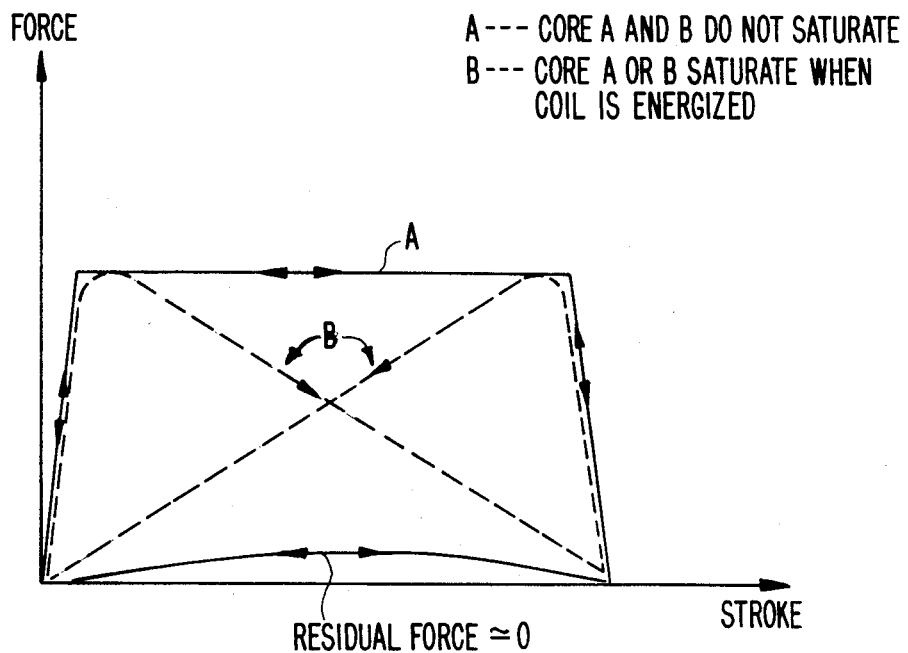
FIG. 5 is a graph showing the force generated by the coils of an electromagnetic linear motion device in accordance with the present invention when the coil cores saturate and when the coil cores do not saturate.

Gap 14 is also sufficiently large to prevent cores 2 and 2' from saturating. When saturation occurs, the force generated by the device decays very quickly as shown in FIG. 5 where B represents the level of force at saturation and A represents the level of force when saturation does not occur. When the coils are prevented from saturating, the force generated by the device remain high for the duration of the stroke.

Gap 14 also sufficiently small to permits only a small amount of flux flow to travel through armature 11. Thus, armature 11 is prevented from becoming demagnetized over time.

Figure 4:
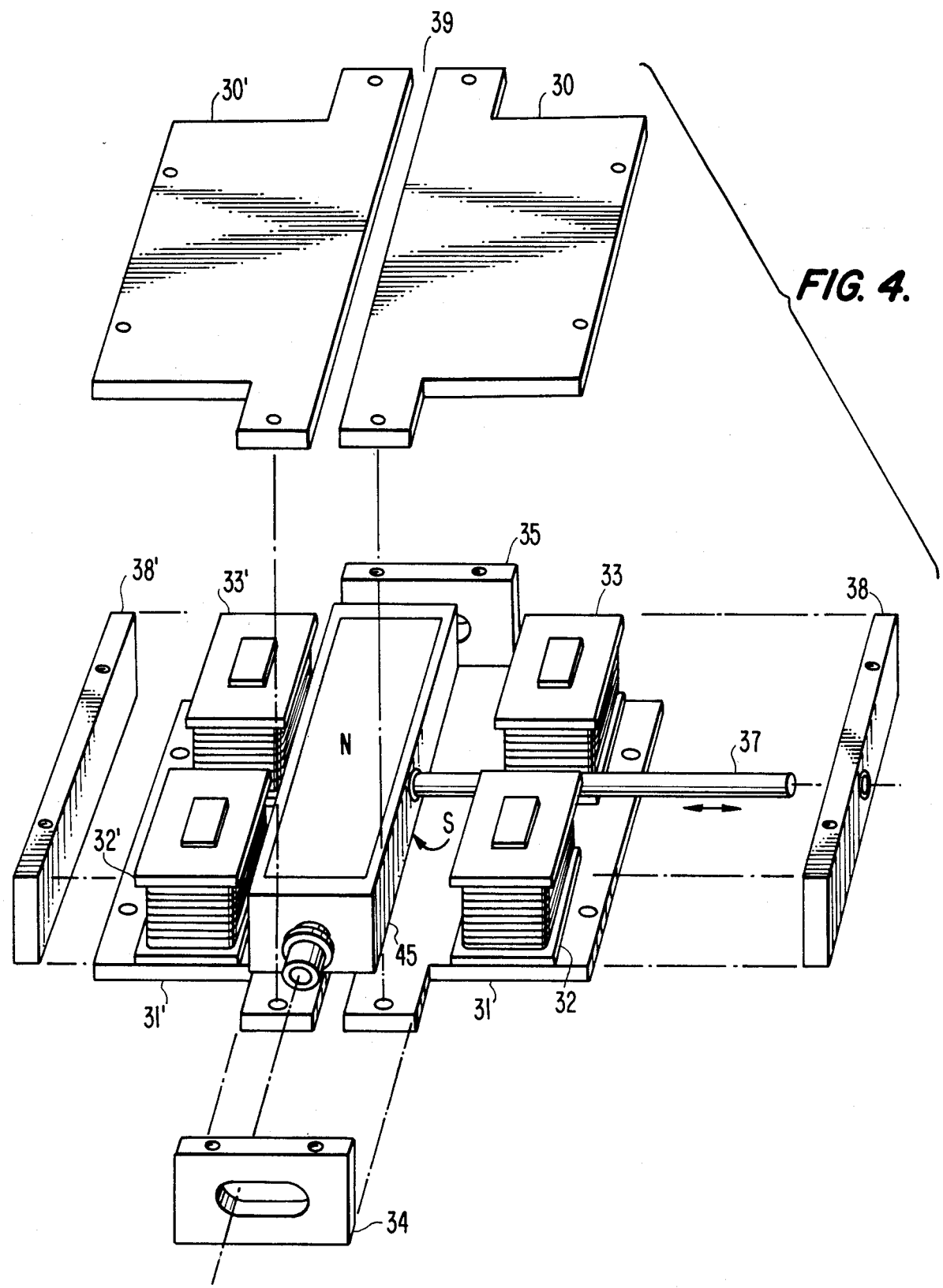
FIG. 4 is an assembly view of an electromagnetic linear motion device in accordance with another embodiment of the present invention.

FIG. 4 illustrates another embodiment of the present invention. The embodiment is similar to the above embodiment. This embodiment comprises first and second electromagnetic units each of which includes upper plate 30, lower plate 31 and a pair of spaced coils 32 and 33. The units are connected together by connecting guide members 34 and 35 with armature 45 dispose therebetween. The operation of armature 45 when each unit is energized is the same as described above with respect to the above embodiment of the present invention. In this embodiment, however, rod 37 is attached to armature 45 for transmitting the movement of the armature in a longitudinal direction through side plate 38. A gap 39 between the electromagnetic units is maintained, however, as described above.

The embodiments of the present invention permits the number of turns of the coils to be increased to provide additional attractive force without increasing the thickness of the device as can be clearly seen from FIG. 2. Thus, the device of the present invention can be used in limited space applications such as the door panels of modern automobiles for operating the door lock mechanism.

Obviously, many modifications and variations of the above described preferred embodiment will become apparent to those skilled in the art from a reading of this disclosure. It should be realized that the invention is not limited to the particular device disclosed, but its scope is intended to be governed only by the the scope of the appended claims.

I claim:

1. An electromagnetic linear motion device, said device comprising:
   first and second spaced electromagnetic units, each of said units having a pair of spaced plates with an electromagnetic coil mounted therebetween, the end of said coil being mounted away from the end of each of said plates to define an armature receiving cavity between said plates and said coil, said armature receiving cavities of said electromagnetic units being positioned adjacent one another whereas the end of the plates of one of said units is spaced from the end of the plates of the other of said units to define a gap between the adjacent plates of said units; and an armature formed solely of a permanent magnet and being disposed between said plates and movable longitudinally within said armature receiving cavities between said first and second coils upon the selective energization of said coils, said gap being sufficiently small to minimize the flow of magnetic flux through said armature and being sufficiently large to prevent saturation of said electromagnetic coil.

2. The electromagnetic device of claim 1 further comprising guide means for guiding said armature during movement within said cavity.

3. The electromagnetic device of claim 2 wherein said guide means comprises at least one stationary guide slot adjacent an end of said armature and a projection on said end of said armature slidably received in said slot.

4. The electromagnetic device of claim 3 further comprising transmitting means coupled to said projection for tansmitting the movement of said armature to an external device.

5. The electromagnetic device of claim 1 wherein said device further comprises means for transmitting the movement of said armature to an external device.

6. The electromagnetic device of claim 1 wherein said armature is urged toward one of said coils and away from the other said coil when the flow of current through each respective coil is in a predetermined direction.

7. The electromagnetic device of claim 1 wherein the width of said gap is sufficiently small to permit a substantial portion of the magnetic flux generated when said units are energized to travel along said upper and lower plates.

8. The electromagnetic device of claim 1 wherein the width of said gap is sufficiently large to substantially prevent saturation of the electromagnetic core of each of said units.

9. The electromagnetic device of claim 1 wherein said first unit and said second unit are arranged so that said upper and lower plates of one of said units serves as a return path for the magnetic flux passing through the other said unit.

10. The electromagnetic device of claim 1 wherein said armature is a permanent magnet.

11. The electromagnetic device of claim 10 wherein substantially all of the magnetic flux produced by said armature passes through the magnetic core of said first and second units.

12. The electromagnetic device of claim 11 wherein the magnetic flux produced by said armature passing through the core of one of said units increase as said armature moves toward said unit and the magnetic flux produced by said armature passing through the core of the other of said units decreased.

13. An electromagnetic linear motion device, said device comprising:

first and second spaced electromagnetic units, each of said units having a pair of spaced plates with electromagnetic coil means mounted therebetween, said coil means in at least one of said units comprising a pair of transversely spaced coils defining a passage therebetween, the end of said coil means being mounted away from the end of each of said plates to define an armature receiving cavity between said plates and said coil means, said armature receiving cavities of said electromagnetic units being positioned adjacent one another whereas the end of the plates of one of said units is spaced from the end of the plates of the other of said units to define a gap between the adjacent plates of said units; and an armature formed solely of a permanent magnet and being disposed between said plates and movable longitudinally within said coil means upon the selective energization of said coil means, said gap being sufficiently small to minimize the flow of magnetic flux through said armature and being sufficiently large to prevent saturation of said electromagnetic coil means.

14. The electromagnetic device of claim 13 further comprising motion transmitting means coupled to said armature and extending through said passage for transmitting the motion of said armature to an external device.

* * * * *